United States Patent [19]

Chenot et al.

[11] 4,258,285
[45] Mar. 24, 1981

[54] TWO-COMPONENT PHOSPHOR IN A COOL WHITE LAMP

[75] Inventors: Charles F. Chenot, Towanda, Pa.; Donald R. Castle, Manchester, Mass.

[73] Assignee: GTE Products Corporation, Stamford, Conn.

[21] Appl. No.: 51,306

[22] Filed: Jun. 22, 1979

[51] Int. Cl.³ .............................................. H01J 61/44
[52] U.S. Cl. .............................. 313/487; 252/301.4 P
[58] Field of Search ................... 313/487; 252/301.4 P

[56] References Cited

U.S. PATENT DOCUMENTS

| | | |
|---|---|---|
| 2,488,733 | 11/1949 | McKeag et al. . |
| 2,965,786 | 12/1960 | Aia et al. . |
| 3,513,103 | 5/1970 | Shaffer . |
| 3,549,552 | 12/1970 | van Broekhoven . |
| 3,670,194 | 6/1972 | Thornton et al. . |
| 4,038,204 | 7/1977 | Wachtel . |
| 4,075,532 | 2/1978 | Piper et al. . |

FOREIGN PATENT DOCUMENTS 956451 10/1974 Canada .

OTHER PUBLICATIONS

Walter, "Applied Optics", vol. 10, pp. 1108–1113, May 1971.

Primary Examiner—Palmer C. Demeo
Assistant Examiner—Darwin R. Hostetter
Attorney, Agent, or Firm—Donald R. Castle

[57] ABSTRACT

Fluorescent lamps containing a two-component phosphor system consisting essentially of europium activated barium magnesium aluminate as a blue emitter and manganese and antimony activated calcium chlorofluorapatite as a yellow emitter use less energy to achieve at least comparable brightness as a standard cool white lamp with a suitable color rendering index.

2 Claims, 3 Drawing Figures

TWO-COMPONENT PHOSPHOR IN A COOL WHITE LAMP

BACKGROUND OF THE INVENTION

This invention relates to cool white fluorescent lamps and to two-component phosphors incorporated therein. More particularly it relates to cool white lamps that contain two-component phosphors and as a result yield higher lumens per watt with a suitable color rendition then do prior cool white lamps.

The color characteristics of light emitted from a fluorescent lamp depend on the choice of phosphors used to coat the internal walls of the lamp envelope. Emission spectra of luminescence centers in most phosphors consist of a single band peak at one particular wavelength. Therefore, in order to have white light it is necessary to either apply a mixture of phosphors or use a single phosphor containing more than one kind of luminescent center (such as the alkaline earth halophosphates). It is not enough to obtain the desired chromaticity coordinates and there are an infinite number of possible combinations of bands that would result in the same set of coordinates. It is also necessary that the lamp produce an acceptable luminous flux (brightness) and satisfactory optimum color rendition for all regions of the visible spectrum.

There are four standard lamps used today, daylight, cool white, white, and warm white and the desired chromaticity coordinates for these lamps are given hereinafter.

While it is possible to determine by theoretical computations the spectral energy distribution for a theoretical blue component and a theoretical yellow component that upon being blended together will yield a lamp having either brightness or color rendition maximized, such theory has to be tailored to the restraints as they exist in nature. In theory, a combination of a line emitting blue component and a line emitting yellow component would yield a lamp having the maximum brightness. Such a lamp however, cannot be produced for a number of reasons. First, phosphors having a line emission do not exist. Secondly, even if they existed the color rendition would be extremely poor because only two colors would be emitted and would result in color distortion in the area lighted by the lamp. Until recently the primary emphasis was placed upon color rendition with a suitable brightness. The single component halophosphates having two luminescent centers have been used to produce the aforementioned four white colors. The energy shortage, however, has shifted the emphasis to maximize lumens per watt of energy with an acceptable color rendition enabling a lower energy input to achieve the same level of brightness. While in theory, a two-component blend can produce warm white, there is no known binary combination of lumiphors that will yield that color, however, it has been discovered that binary blends can be made which will produce the other three colors.

U.S. Pat. No. 4,075,532 discloses that europium-activated barium magnesium aluminate can be used with a calcium fluoraapatite to achieve a cool white lamp. However, the teachings are primarily directed to the europium-activated strontium chloroapatite. In FIG. 3 of the foregoing patent the europium-activated strontium chloroapatite is represented by number 41 on the portion of the CIE diagram contained in that figure. The x and y coordinates for that phosphor are $x=0.152$ and $y=0.027$. No data are given for the europium-activated barium magnesium aluminate. The europium-activated barium magnesium aluminate has a higher y value than the europium-activated strontium chloropatite therefore when combined with a calcium fluorapatite the resulting combination will not yield a material having an emission within the cool white ellipse. Since the europium activated barium magnesium aluminate is a more efficient phosphor than europium activated strontium chloroapatite, it is desirable to utilize the aluminate material.

It is believed therefore that a two-component phosphor system which utilizes europium-activated barium magnesium aluminate and a halo phosphate phosphor to achieve a cool white lamp having a higher efficiency then the standard cool white lamp would be an advancement in the art.

OBJECTS AND SUMMARY OF THE INVENTION

It is an object of this invention to provide a lamp employing a two-component blend including europium-activated barium magnesium aluminate that emits light similar to cool white, however, such a lamp has a higher lumen watt output then the present cool white lamps.

In accordance with this invention lamps use less energy to achieve a comparable or a higher brightness than standard cool white lamps, and have suitable color rendering indexes are achieved by utilizing a specific two-component phosphor system that consists of essentially of europium-activated barium magnesium aluminate in specified amounts and a second component having a peak emission in the yellow region consisting essentially of manganese and antimony activated calcium chloro-fluorapatite having specific amounts of chlorine added to the molecule.

Figure 1:
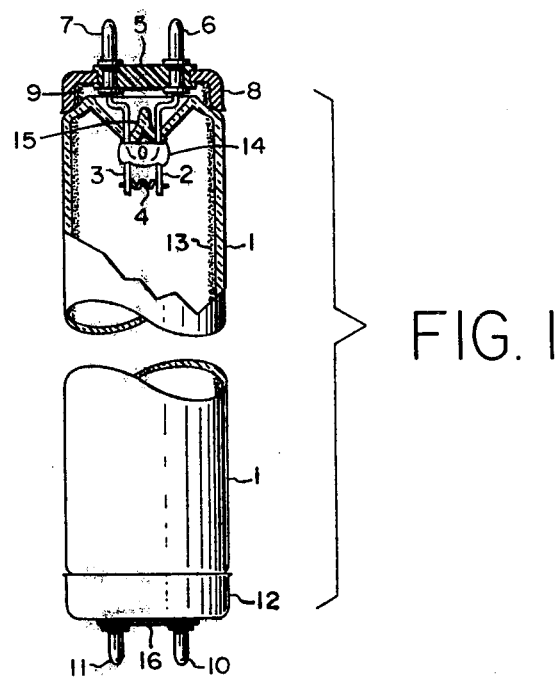
FIG. 1 is a fluorescent lamp having the phosphor system of this invention deposit as a coating on the internal surfaces of the lamp envelope.
Figure 3:
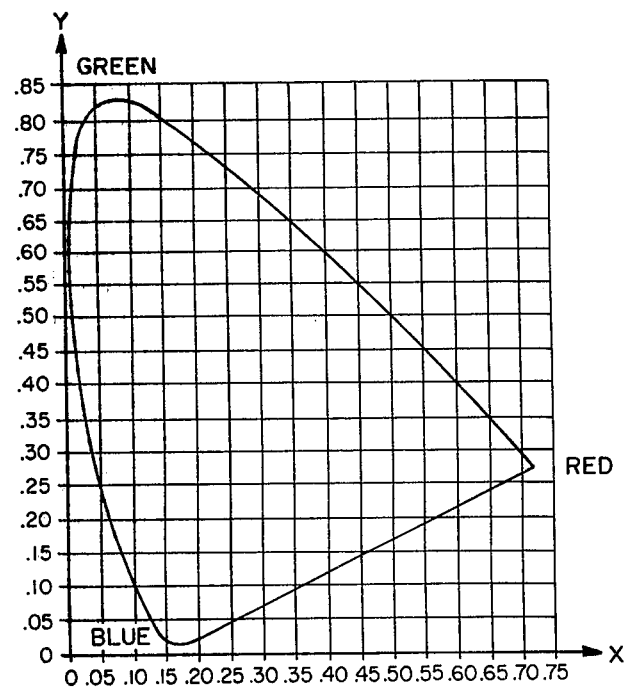
FIG. 3 is a reproduction of the CIE chromiticity diagram.

For a better understanding of the present invention, together with other and further objects, advantages and capabilities thereof, reference is made to the following disclosure and appended claims in connection with the above-described drawings.

DETAILS OF THE PREFERRED EMBODIMENTS

The chromaticity coordinates for the standard lamps are as follows:

| Lamp | X | Y |
|---|---|---|
| Daylight | 0.313 | 0.337 |
| Cool White | 0.372 | 0.375 |
| White | 0.409 | 0.394 |
| Warm White | 0.440 | 0.403 |

In theory, the binary blends which would yield the maximum brightness are represented in the following table and as previously reported by Walter, one of the inventors of this invention, in *Applied Optics*, Vol. 10, page 1108, (1971).

| Lamp | % Blue Component In The Blend | Line Emission Blue | Line Emission Yellow |
|---|---|---|---|
| Daylight | 29.1% | 444 | 567.6 |
| Cool White | 19.0% | 444 | 573.5 |
| White | 13.5% | 444 | 576.7 |
| Warm White | 9.7% | 444 | 579.6 |

As previously mentioned phosphors having line emission do not exist in nature and lamps employing such phosphors (even if they did exist) would not yield a color rendition acceptable for most purposes. It is necessary that phosphor having a band emission be used and into the color rendering index, as defined in the aforementioned article, should be at least about 45.

Also it is possible to calculate the theoretical two-component system that would yield a lamp having a suitable color rendition and brightness. These theoretical systems are given in the table below.

| | Daylight | Cool White | White | Warm White |
|---|---|---|---|---|
| BLUE | | | | |
| Peak (Nanometers) | 486 | 507 | 522 | 537 |
| 50% Bandwidth (Nanometers) | 111 | 121 | 128 | 135 |
| YELLOW | | | | |
| Peak (Nanometers) | 601.0 | 606.8 | 611.7 | 614.4 |
| 50% Bandwidth (Nanometers) | 85 | 44 | 44 | 44 |
| % of Yellow Component | 60.9% | 63.5% | 60.5% | 58.5% |

These data were also reported in *Applied Optics*, supra. In that article an arithmetic mean of the brightness index and the color rendering index was assumed. It has been found, however, that a CRI of from 45 to 50 is satisfactory for some major purposes where color is not the prime consideration. Such purposes include lighting in warehouses, garages, tunnels, corridors, etc..

Cool White is defined as a color having x and y coordinates of 0.372 and 0.375 respectively. The lighting industry has accepted a somewhat broader definition as being any light source that falls within a relatively small oval having the forementioned coordinates at a center as shown by 20 in FIG. 2. The x value is for cool white phosphor therefore can vary about 0.363 to 0.381 and the y values can vary from about 0.364 to about 0.386 as long as the combined x and y colors fall within the cool white ellipse that is shown in the FIG. 2.

Any phosphor blends must have color coordinates such that when the compensation through the mercury emission is made that a line connecting each of them will pass through the standard cool white oval.

Figure 2:
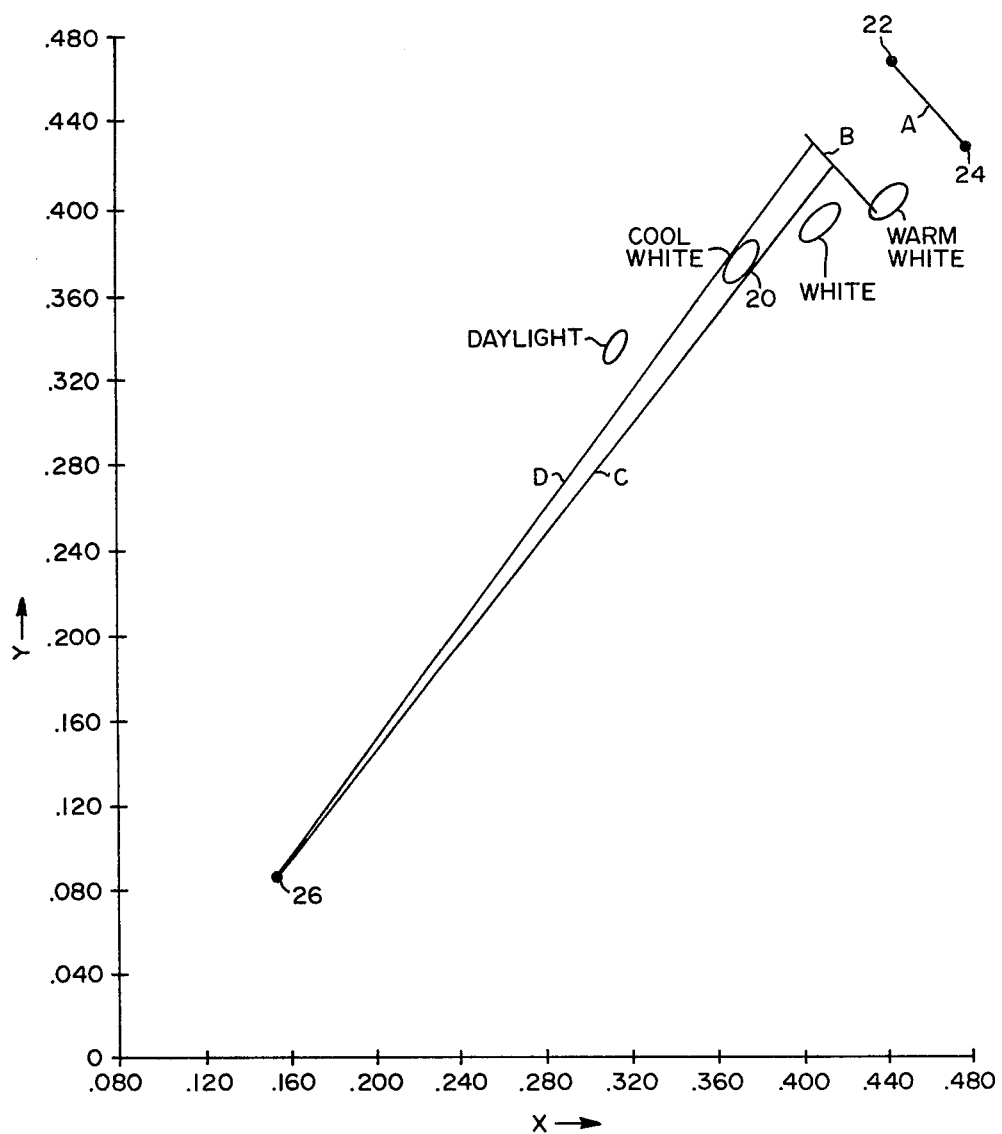
FIG. 2 is a portion of the CIE chromiticity diagram containing information concerning the present invention.

With particular reference to FIG. 2, the chromaticity of various phosphor compositions represented by the formula, $$Ca_{5-w-x-y}Cd_wMn_xSb_y(PO_4)_3F_{1-y-a}Cl_aO_y$$

wherein
w is from 0 to about 0.05
x is from about 0.13 to about 0.17
y is from about 0.02 to about 0.04
a is from 0 to about 0.1 have been found to have emissions that fall along line A in FIG. 2. The composition represented by the formula $$Ca_{4.775}Cd_{0.037}Mn_{0.157}Sb_{0.031}(PO_4)_3F_{0.969}O_{0.031}$$

has an emission represented by point 22 in FIG. 2. As the chlorine content increases from 0 to 0.1 the x value increases and the y value decreases along A. Point 24 represents a composition wherein 10% of the fluorine is replaced by chlorine. When the emission of these phosphors is combined with the emission characteristics of the mercury in a standard fluorescent lamp, the combined emission falls along line B in FIG. 2.

The blue-emitting phosphors which are useful in the practice of this invention are europium activated barium magnesium aluminates of the formula $$Ba_wMg_xEu_yAl_{11}O_{16.5+w+x+y}$$

wherein
w is from about 0.05 to about 1.2
x is from about 0.05 to about 1.2
y is from about 0.025 to about 0.125
stated in another manner, the phosphor composition consists essentially of a host consisting essentially of from about 0.4 to about 9.8 mole percent of barium oxide from about 0.4 to about 9.8 mole percent of magnesium oxide and from about 80.4 to about 99.2 mole percent of aluminum oxide, on an Al $O_{1.5}$ basis, and as an activator, from about 0.025 moles to about 0.125 moles of divalent europium per mole of host. These materials in a standard lamp have chromaticity coordinates of x=0.152 and y=0.086 and are represented by point 26 in FIG. 2.

As can be appreciated manganese and antimony-activated calcium fluoroapatite and the europium-activated barium manganese aluminate can not be combined to yield a color falling within the cool white ellipse. It has been found that from about 0.5% to about 2% of the fluorine in the calcium fluoroapatite must be replaced with chlorine in order to achieve a lamp that has a color that fall within the cool white ellipse. A line, D, connecting point 22 and 24 in FIG. 2 passes to the left of the cool white ellipse. Increasing the chlorine value of about 2% replacement causes a line to pass to right to the cool white ellipse. It is therefore believed apparent that it is crucial that the chlorine content be kept within the 0.5% to the 2.0% limits in order for a cool white lamp to be achieved. As is shown in FIG. 2 lines C and D from point 26 (the color coordinates for the europium activated barium magnesium aluminates) which are tangent to the cool white ellipse 20 intersect line B at points which correspond to the forgoing 0.5% and 2.0% replacement. Thus in the formula for the calcium chlorofluorapatite, a is from about 0.005 to about 0.02.

With particular reference to FIG. 1, the sealed glass envelope 1 has the lead-in wires 2, 3, sealed through one of its ends and corresponding lead-in wires sealed through the other end. The usual coiled-coil 4 of tungsten wire is supported between, and electrically connected to, the pair of lead-in wires 2, 3, and a similar coil is supported by and connected to the lead-in wires at the other end of the envelope 1. An insulating base piece 5 having contact pins 6 and 7, each pin being connected to one of the lead-in wires, held in the metal cap 8, which is fixed by the cement 9 to one end of the envelope 1, and a similar base piece 16, having contact pins 10 and 11, is cemented to the other end by cup 12.

The tungsten coils carry the usual electron-emitting coating of alkaline earth oxides, generally including also a small percentage of zirconium dioxide.

A filling of inert gas such as argon, neon, krypton, and mixtures thereof, at about 2 millimeters of mercury pressure, and the usual small quantity of mercury is inside the glass envelope 1. The lamp has the usual stem press 14 and sealed exhaust tube 15.

On the inside surface of the envelope, is a layer 13 of the phosphor materials previously described. To aid in the present manufacturing of fluorescent lamps the individual phosphors are preblended to give a uniform mixture prior to depositing the phosphors, however, this invention is not limited to providing a uniform blend if other techniques are used to manufacture lamps. All that is required is that each phosphor be relatively uniformly deposited over the internal surfaces of the glass envelope.

The amount of the relative components that are used will depend upon whether a blend in the sense of the uniform admixture is utilized or whether a uniform distribution of two distinct layers are used. In the event two distinct layers are used, the amount of the inner layer will be decreased from the amount that is used in a blend. As is appreciated in the art if two phosphors having the same efficiency were utilized the amount of each phosphor that would be used when a blend is employed would be in the inverse relationship to the respective distances between the cool white target and the x and y coordinates of each of the individual phoshors when plotted on the CIE diagram. Thus in the practice of the present invention when a blend is employed from about 2 to about 15% by weight of the blue emitting phosphor is required with the efficiencies of the particular phosphors. If a two-layer approach is used the amounts of the inner layer would be decreased from that required in a blend, For example that if the blue-emitting material is used as the inner layer, the amount required is reduced by as much as 90 percent of that required in a blend and a similar reduction is achieved if the yellow-emitting phosphor is used as the inner layer. Thus in practice of the present invention from about 0.2% to about 70% by weight of the total phosphor utilized can be the blue emitting compound, that is the europium activated barium manganesium aluminate and the balance is the yellow emitting phosphor.

While there has been shown and described what are at present considered the preferred embodiments of the invention, it will be obvious to those skilled in the art that various changes and modifications may be made therein without departing from the scope of the invention as defined by the appended claims.

What is claimed is:

1. A fluorescent lamp comprising a light-transmitting envelope having electrodes, an inert ionzable gas and a charge of mercury therein and a coating of phosphor on the inner surfaces of said envelope, said phosphor consisting essentially of from about 0.2% to about 70% by weight of a blue emitting phosphor composition of the formula $$Ba_wMg_xEu_yAl_{11}O_{16.5+w+x+y}$$

wherein w and x are each from about 0.05 to about 1.2 and y is from about 0.025 to about 0.125 and the balance is a yellow emitting phosphor of the formula $$Ca_{5-w-x-y}Cd_wMn_xSb_y(PO_4)_3F_{1-y-a}Cl_aO_y$$

wherein a is from about 0.005 to about 0.02 w is from 0 to about 0.05 x is from about 0.13 to about 0.17 y is from about 0.02 to about 0.04 said lamp having an emission yielding chromaticity coordinates that fall within the cool white ellipse.

2. A lamp according to claim 1 wherein a blend of the phosphors is coated on inner layer of the envelope and the blue emitting phosphor constitutes from about 2% to about 15% by weight of the total composition.

* * * * *